United States Patent [19]
Bass et al.

[11] 4,235,668
[45] Nov. 25, 1980

[54] CONFINEMENT OF HIGH TEMPERATURE PLASMAS

[75] Inventors: Robert W. Bass, Provo; Helaman R. P. Ferguson, Orem, both of Utah; Harvey J. Fletcher, Coltsneck, N.J.; John H. Gardner, Provo, Utah; B. Kent Harrison, Provo, Utah; Kenneth M. Larsen, Provo, Utah

[73] Assignee: Brigham Young University, Provo, Utah

[21] Appl. No.: 515,858

[22] Filed: Oct. 18, 1974

Related U.S. Application Data

[63] Continuation-in-part of Ser. No. 300,781, Oct. 25, 1972, abandoned.

[51] Int. Cl.$^2$ .............................................. G21B 1/00
[52] U.S. Cl. ...................................... 176/3; 315/111.7
[58] Field of Search ........................................ 176/1-3, 176/5; 315/111.7

[56] References Cited

U.S. PATENT DOCUMENTS

| | | | |
|---|---|---|---|
| 3,009,080 | 11/1961 | Loos | 176/3 |
| 3,088,894 | 5/1963 | Koenig | 176/1 |
| 3,219,534 | 11/1965 | Furth | 176/1 |
| 3,278,384 | 10/1966 | Lenard et al. | 176/1 |
| 3,663,362 | 5/1972 | Stix | 176/2 |
| 3,677,890 | 7/1972 | Hartman | 176/1 |
| 3,692,626 | 9/1972 | Ohkawa | 176/3 |

OTHER PUBLICATIONS

Soviet Physics—Technical Physics, vol. 7, No. 3, 9/62, pp. 187-191 by Skornyakov.
Physics of Fluids, vol. 9, 1966, pp. 2295, 2296 by Yoshikawa et al.
Technology Review, 12/76, pp. 20-24, 33-39, 41-43.
MATT-1050, 8/74, pp. 526-529.
ERDA-28, 1/75, pp. 1-3, 8-10.
Bulletin of the American Physical Society, 11/16/71, p. 1239, by Bass.
Proceedings of the Utah Academy of Sciences, Arts, & Letters, vol. 50, part 2, 1973, by Gardner et al., pp. 1-11.

*Primary Examiner*—Harvey E. Behrend
*Attorney, Agent, or Firm*—Jules P. Kirsch

[57] ABSTRACT

A high temperature plasma is confined in the shape of a topological torus by a topologically stable magnetic field which is everywhere constant on and tangent to the surface of the torus. There are exactly an even finite number of closed magnetic field lines on the plasma surface and all other magnetic field lines on the surface are asymptotic to the closed field lines. This magnetic field configuration is achieved by a set of current carrying conductors appropriately arranged with respect to the plasma and carrying suitably selected currents.

10 Claims, 12 Drawing Figures

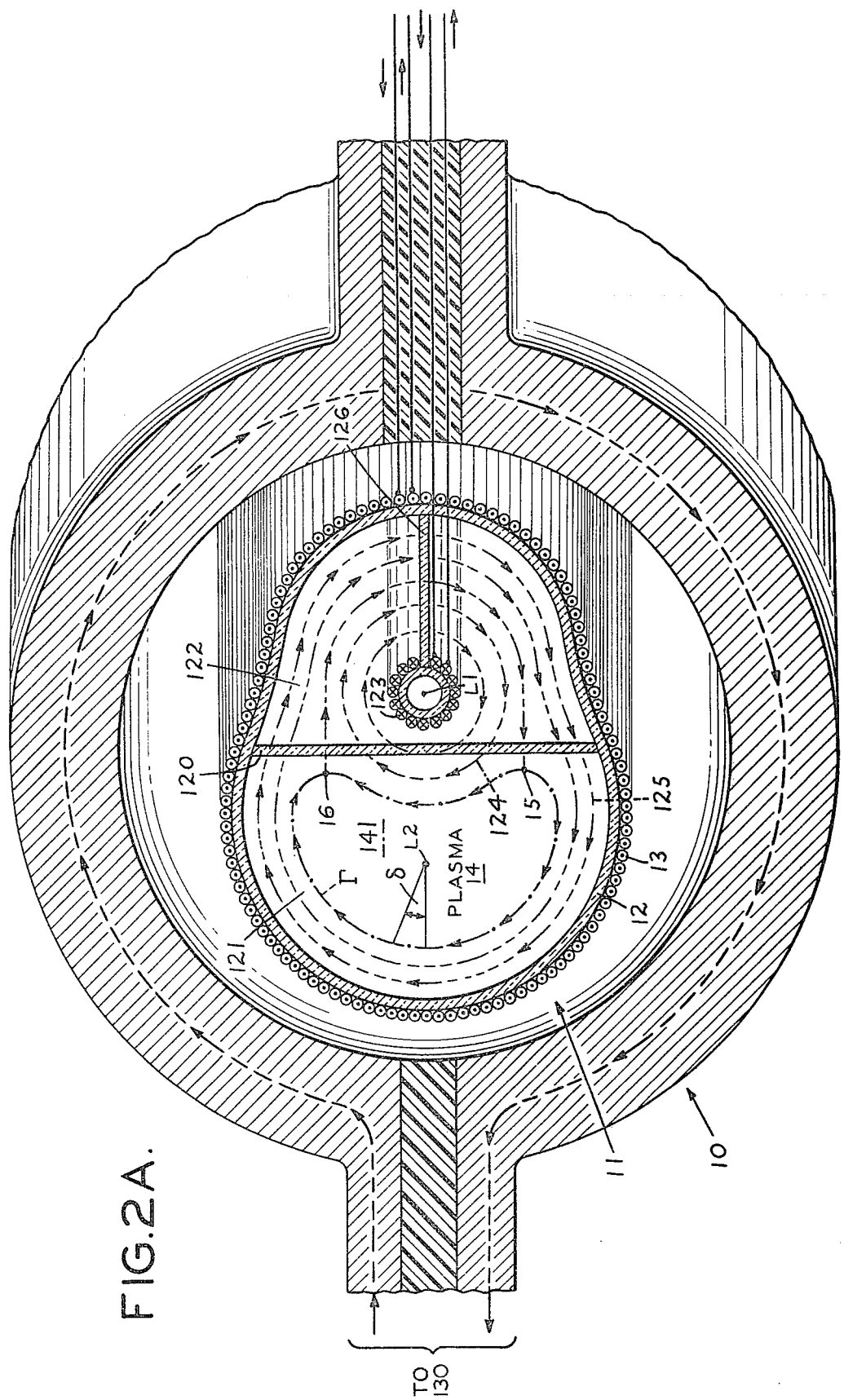

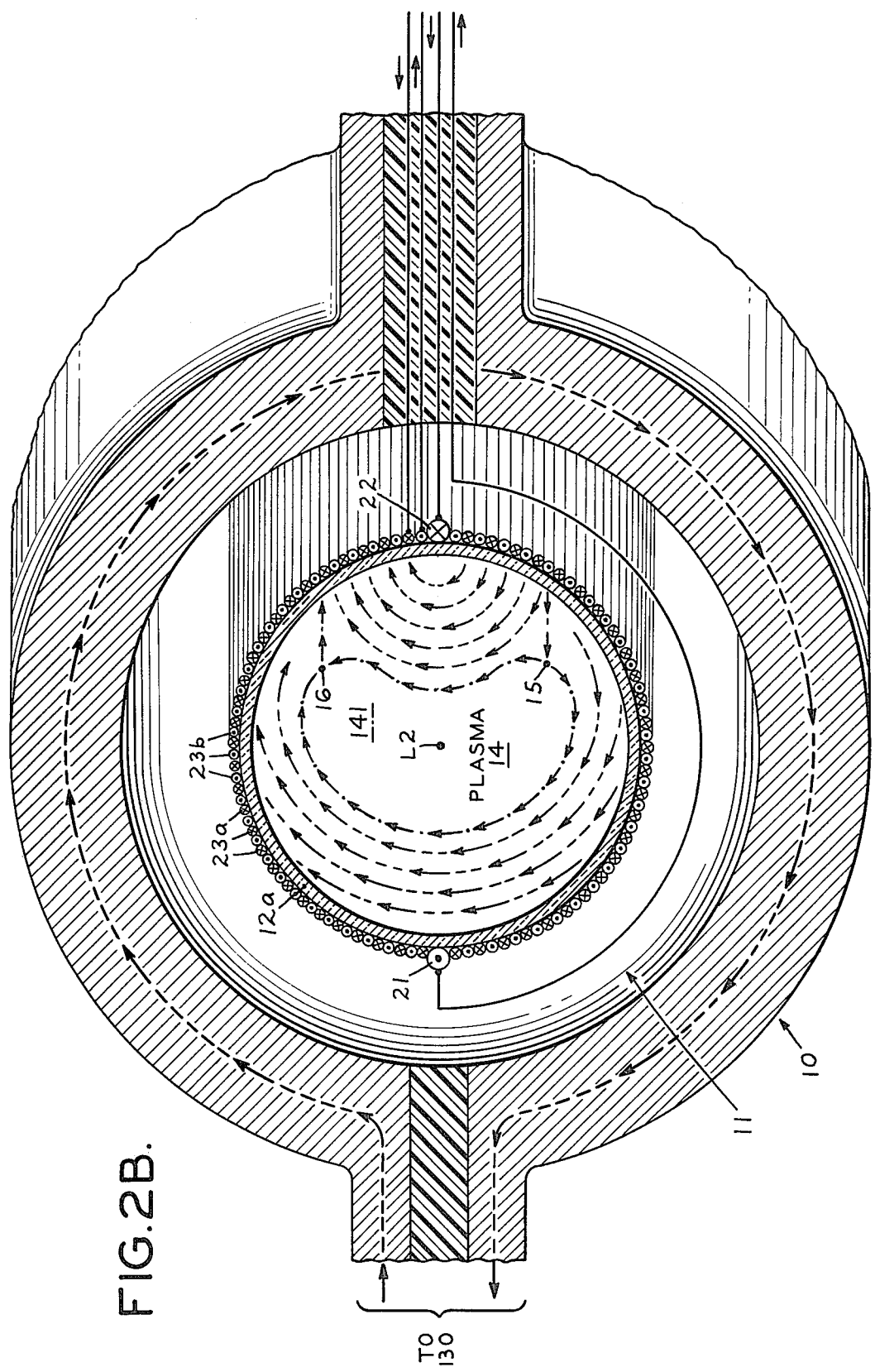

$\alpha = 1.50$
$t = 0.45$
$u_0 = 0.50$
$u_1 = 25$
$\lambda = 15$
$g = 50$ $\alpha = 1.50$
$t = 0.45$
$u_o = 0.50$
$u_i = 25$
$\ell = 15$
$\vartheta = 50$

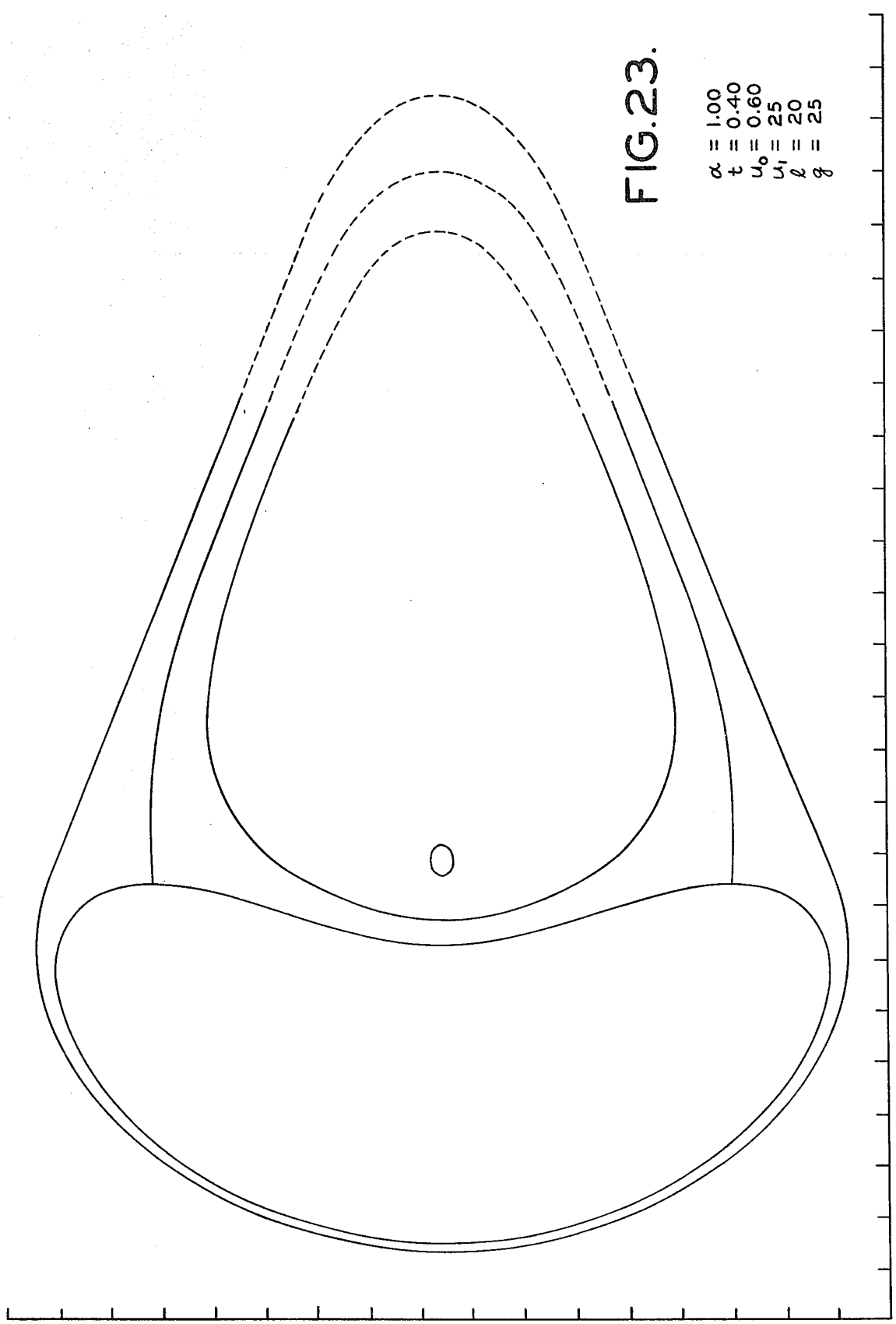

CONFINEMENT OF HIGH TEMPERATURE PLASMAS

BACKGROUND OF THE INVENTION

This application is a continuation in part of application Ser. No. 300,781, filed Oct. 25, 1972, entitled "Confinement of High Temperature Plasmas," now abandoned.

The stable confinement of a plasma at thermonuclear temperatures for a sufficiently long time and at a sufficiently high density to produce energy in economically useful quantity is a goal which has been long sought but never attained. Most confinement schemes use magnetic fields to isolate the plasma away from the walls of the container so that it can be heated to thermonuclear temperatures which are of the order of twenty million degrees Celsius. Such magnetic containment schemes, sometimes referred to as magnetic bottles, have proved to be subject to instabilities which lead to loss of the plasma to the walls of the container generally within a few milliseconds.

The characterization of the magnetic containment field as a magnetic bottle is not entirely apt since it suggests that this field provides a rigid constraint to the motion of the plasma. If this were the case, the confining structure could be arbitrarily strengthened to guard against failure due to disturbances in the dynamical system being confined. Actually, however, the magnetic pressure due to the external confining field must at all times and all points on the plasma surface equal the sum of the internal magnetic field and fluid pressures if the plasma configuration is to be maintained. Hence, the magnetic bottle confining the plasma is very sensitive to plasma conditions and it cannot be strengthened without altering the equilibrium. Furthermore, currents in the plasma, both those that have been induced and those due to random fluctuations in the plasma, give rise to a significant, even if not large, part of the magnetic containment field, and therefore, the currents play a role in determining the shape of the plasma surface. This demands that careful consideration be given to the stability properties of the bottle itself: if it is disturbed, as it will be by inevitable fluctuations in the plasma currents, the bottle is stable if it remains near the original configuration, but it is unstable if the disturbance grows and permits the escape of the plasma.

If the disturbance grows without limit in such a way as to retain the topological character of the system of trajectories, or phase portrait, defined by the vector magnetic field on the plasma surface, as this phase portrait would if it undergoes a bending or stretching, or more precisely, a homeomorphism, then the system consisting of the plasma together with the confining magnetic field is said to have ordinary instability but it is topologically stable. If, on the other hand, under sufficiently small continuous changes of the parameters the phase portrait of the vector field makes a discontinuous change into a topologically different configuration, analogous to a tearing, a breaking, or the transformation from closed to open trajectories, then the system under constraint is topologically unstable. An instability of this second kind involving a change of topology is potentially catastrophic and the study of these instabilities is often called catastrophe theory.

In particular, a magnetic field is topologically stable if the topological character of the magnetic field lines remains invariant under perturbation by any other sufficiently small magnetic field whatsoever.

To illustrate the nature and significance of topological stability as applied to the design of a magnetic bottle for containing high temperature plasmas we first consider a typical toroidal magnetic bottle which fails to have topological stability. Specifically, we begin by representing a torus, as is often done, by a rectangle with opposite sides considered as being identical. FIG. 4 illustrates this initial situation in which the torus can be thought of as being obtained by "sticking together" the two sides labelled A to obtain a cylinder and then "sticking together" the two sides labelled B to complete the torus. The parallel directed lines shown in FIG. 5 represent magnetic field lines being drawn on the rectangle so that every point of the interior of the rectangle lies on exactly one such line as indicated in FIG. 5, and so that field lines never cross. Those lines lie on the surface of the torus, so that the path of any given line will either eventually return to any given starting point on that line so that all lines are closed topological circles, or will never return to any given starting point on that line so that then all lines are open (and infinitely long) topological arcs. In the latter case any field line will come arbitrarily close to any given point on the surface and is said to be ergodic. The importance of this example for the purpose of illustrating the meaning of topological stability is that any change in direction of the system of lines, however small, is capable of altering the topology of the lines from being all closed to being all open or vice versa. Thus a toroidal magnetic bottle having magnetic field lines on the surface of the torus which are capable of being altered in this manner is not topologically stable.

The ability of a toroidal magnetic bottle to hold plasma is crucially affected by such a change from closed to open or open to closed field lines. The well-known results on the German Stellerator Wendelstein I, IIa, IIb and on the Russian Stellerator TOR-1 (*Plasma Physics and Controlled Nuclear Fusion Research*, Vol. III, 1971, IAEA, Vienna) provide strong experimental evidence for this. In fact there are well known differences between closed and open magnetic field lines, because the closed lines, unlike the open lines, are subject to "resonance" phenomena such as the global interchange instability.

Various other "catastrophes" associated with magnetic field configurations in which the field lines on the surface of a torus are either all closed or all ergodic have been described, notably by V. I. Arnol'd (Sov. Math. Dokl. No. 2 (1962) pp. 1008–1011; and Russian Math. Surveys, Vol. 18, No. 6 (1968), pp. 85–193; see also ibid., No. 5, pp. 9–36), by C. L. Siegel, J. K. Moser, et al. (Lectures on Celestial Mechanics, Springer-Verlag (1971); *Lectures on Hamiltonian Systems*, Memoirs A. M. S. 81, 1968; *Rigorous and Formal Stability of Orbits About An Oblate Planet*, Am. Math. Soc. Memoirs, Vol. 81, 1968) following the lead of H. Poincaré (*Les Méthodes Nouvelles de la Méchanique Céleste*, Vol. II, p. 389). These phenomena are variously referred to as "magnetic island" formation, "wild line" formation, and "magnetic braiding." These are non-confinement topologies and the flow or change from a confining to a non-confining topology under a small perturbation from, for example, an ergodic topology, which is confining, to one of these non-confining topologies would correspond to the "shattering" of the magnetic bottle. This imposes stringent tolerances on the construction of toroidal magnetic confinement devices in order to avoid catastrophic consequences arising from very small perturbation.

Lack of ordinary stability in an engineering system is not necessarily limiting since the lack of such stability is often manageable with feedback stabilization. This generally catastrophic character of topological instabilities, on the other hand, render them intractable to feedback stabilization. Topologically unstable engineering systems are, therefore, uncommon and generally avoided. This is likewise true in the morphology of biological forms where, while ordinary instability is common since it allows mobility and volition and can be accommodated by feedback, only those structures which have topological stability are favored (see R. Thom, *Stabilité Structurelle et Morphongénèse*, Benjamin, 1972). Similarly, ordinary instability in a nuclear magnetic confinement device of manageable size can be expected to be feedback stabilizable if the magnetic confinement field has topological stability. Topological stability is, therefore, of primary importance in determining a viable design of a magnetic bottle for thermonuclear confinement.

SUMMARY OF THE INVENTION

The subject of this invention is a topologically stable magnetic plasma confinement arrangement, in which topological stability is achieved by a magnetic field that is everywhere constant on and tangent to the surface of a plasma having the shape of a topological torus with exactly an even finite number of closed field lines on the toroidal surface and all other field lines on the toroidal surface asymptotic to these. This magnetic configuration is achieved by a set of current carrying conductors properly arranged with respect to the exterior of the plasma and carrying suitably adjusted currents.

It should be emphasized that the subject of this invention is the new type of "magnetic bottle" itself and not a specific arrangement of current carrying conductors, wires or other devices which produce and maintain the novel "magnetic bottle," since any one of a wide variety of schemes can be devised to produce the desired magnetic field once the "magnetic bottle" has been properly characterized and described.

It should be noted that the requirement of a tangent magnetic field constant in magnitude everywhere on the surface implies an equilibrium surface but says nothing about whether or not this equilibrium has ordinary stability. However, in at least one special case, namely, the axially symmetric case, the magnetic configuration described also has ordinary stability in the sense of minimum average $|B|$ and is stable against global instabilities (sausage, kink, flute), and also against local instabilities for sufficiently large aspect ratios (ratio of the major radius to minor scale length of the toroid). However, in general, topological stability is the only type of stability ensured by this invention.

The magnetic confinement taught by the principles of this invention can be strengthened by the additional requirement that there be a region adjacent to and outside of the plasma surface in which all magnetic field lines are transient; that is, they enter and leave this region. This requirement ensures the topological stability of this portion of the magnetic confinement field.

BRIEF DESCRIPTION OF THE DRAWINGS

The present invention will be fully understood from the following detailed description of illustrative embodiments thereof taken in connection with the appended drawings, in which like reference characters designate like elements throughout the several drawings; to avoid unnecessarily complicating the drawings, the insulators or other means well known to those skilled in this art for maintaining the conductors in their proper positions have not been shown, and similarly power supplies shown in the drawings should be understood to be representative of a multiplicity of power supplies necessary to drive the several currents required by the principles of this invention.

DESCRIPTION OF VARIOUS EMBODIMENTS

FIGS. 1, 2A, 2B, 3A, 3B, 6 and 7 illustrate the simplest embodiment of the invention, that is, the axially symmetric one in which there are exactly two closed field lines 15, 16 on the toroidal surface. These divide the surface into two regions, both concave towards the toroidal axis, with oppositely directed toroidal current components in these surfaces. The two closed field lines are purely toroidal and are referred to as limit cycles since all other field lines on the surface leave one of them asymptotically and approach the other asymptotically.

This special case is disclosed in copending continuation in part application entitled "Confinement of High Temperature Plasmas, Ser. No. 515,859, filed Oct. 18, 1974."

Figure 1:
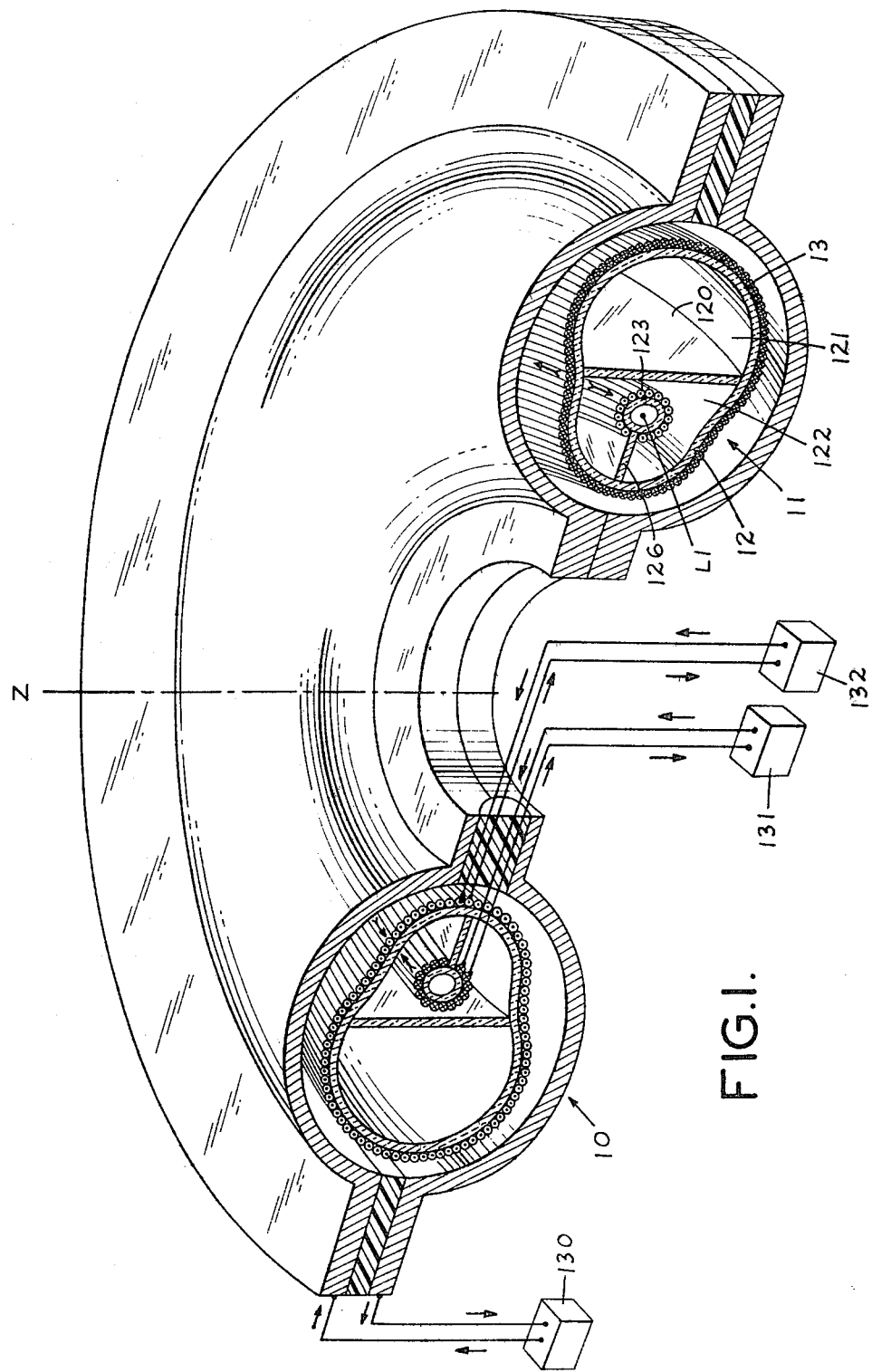
FIG. 1 is a schematic perspective view partially in section illustrating the various current conductors and other elements embodying the principles of this invention.
Figure 3A:
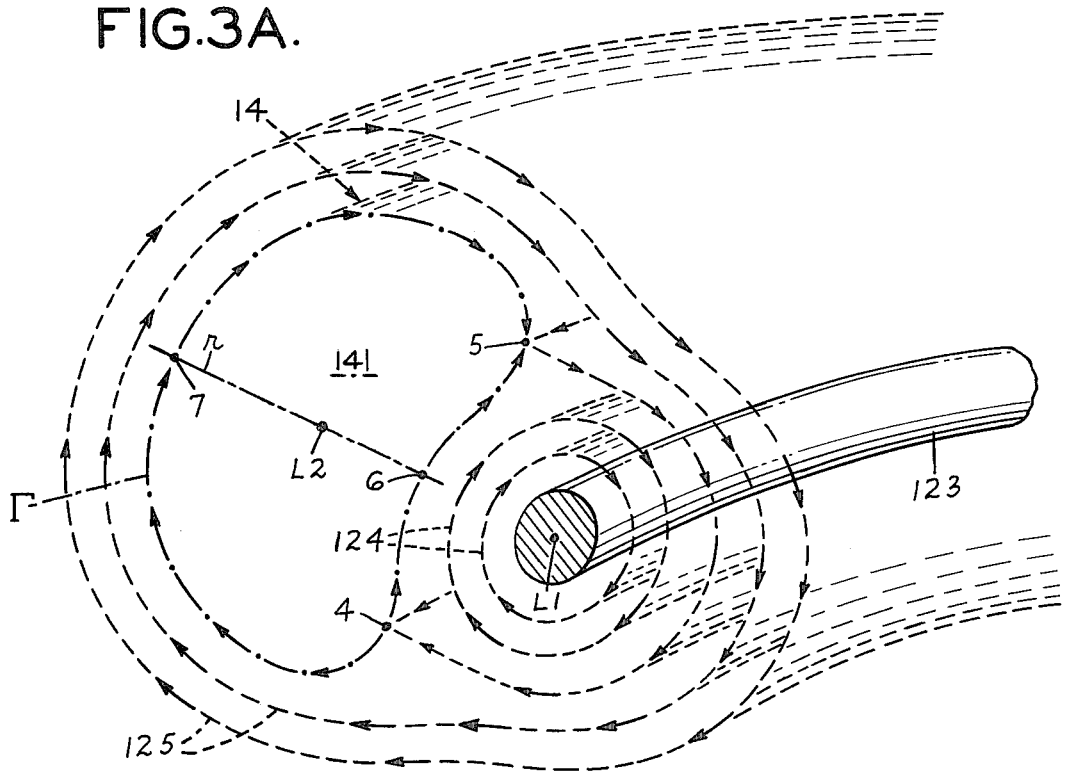
FIG. 3A is a perspective view showing in partial section the families of magnetic surfaces generated by the current conductors shown in FIG. 2A.
Figure 2A:
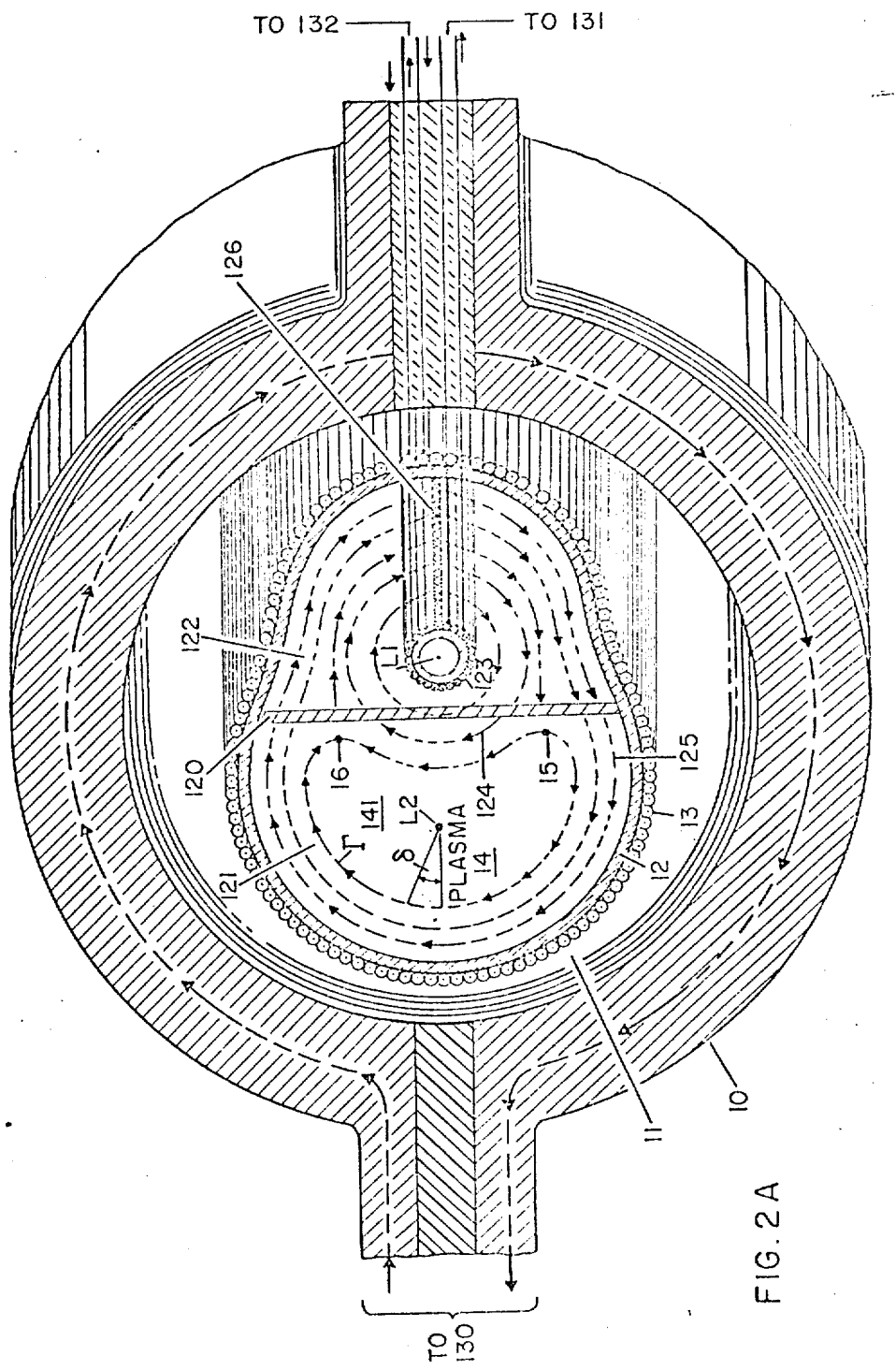
FIG. 2A is a cross-section of a portion of the elements shown in FIG. 1.
Figure 2B:
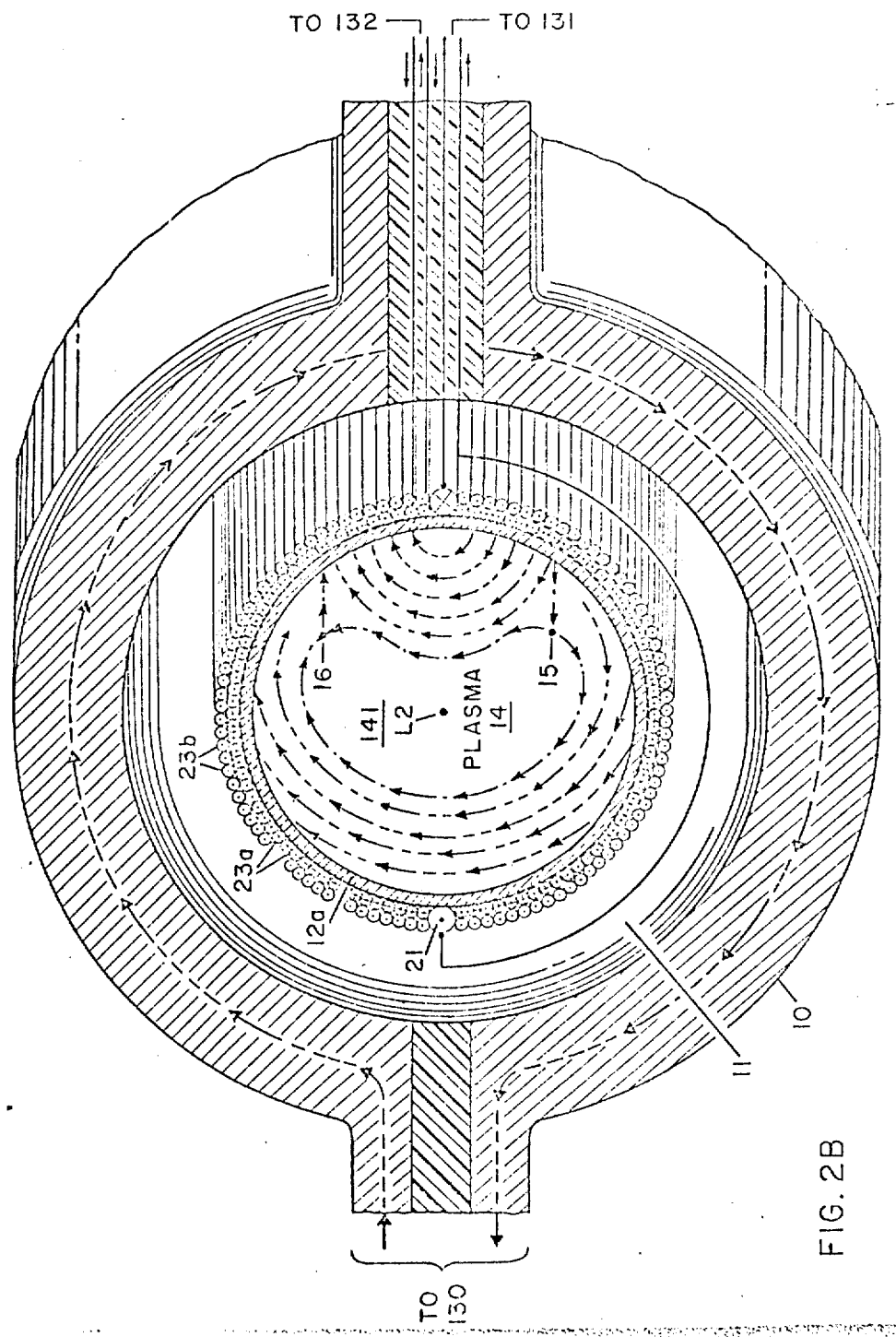
FIG. 2B is a cross-section of a portion of elements alternative to those shown in FIG. 2A.
Figure 3A:
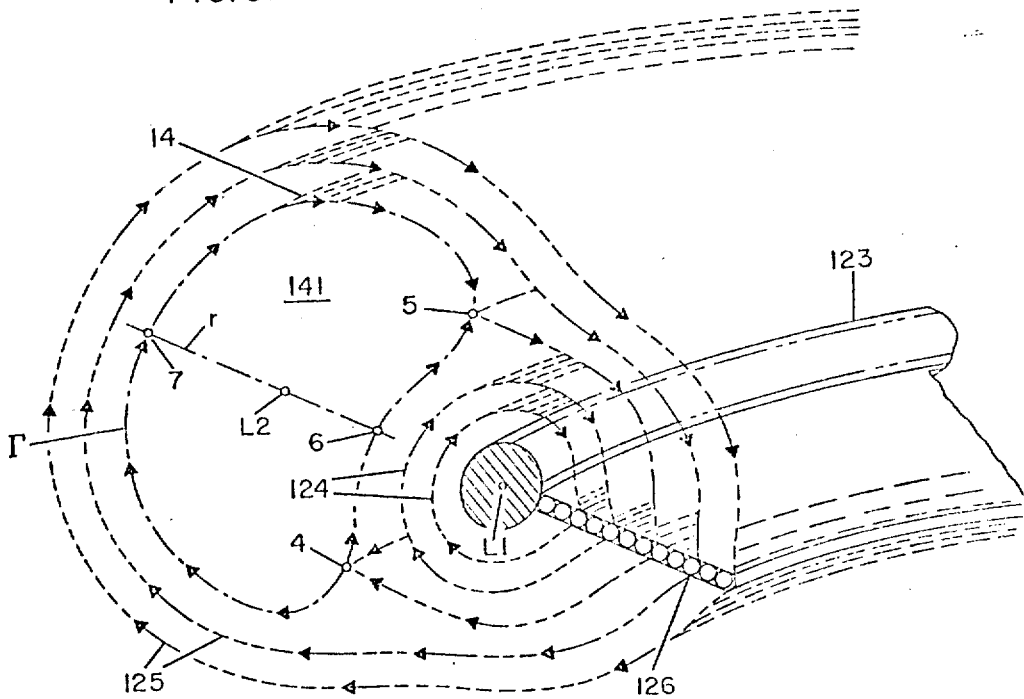
Figure 3B:
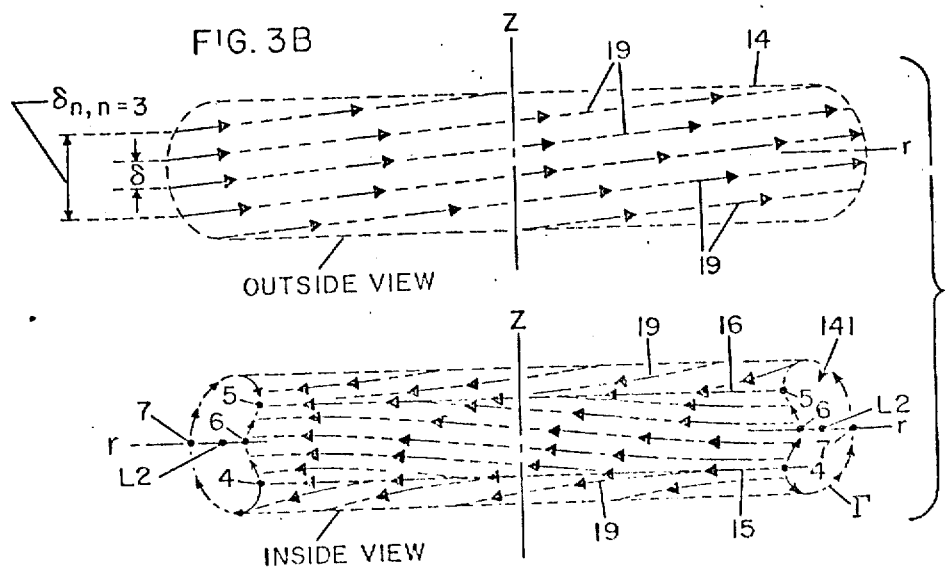
Figure 4:
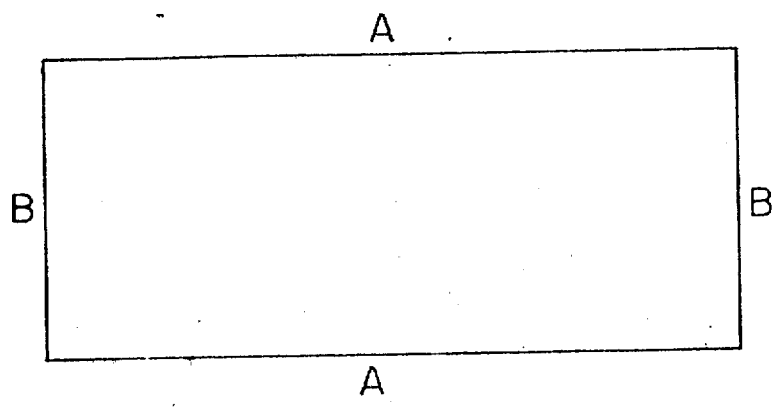
Figure 5:
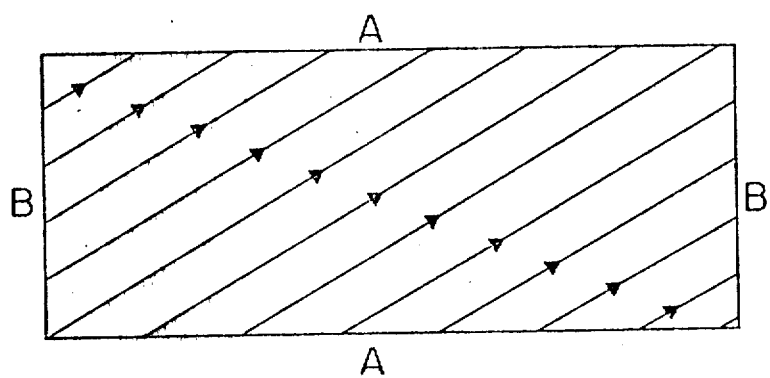
Figure 6:
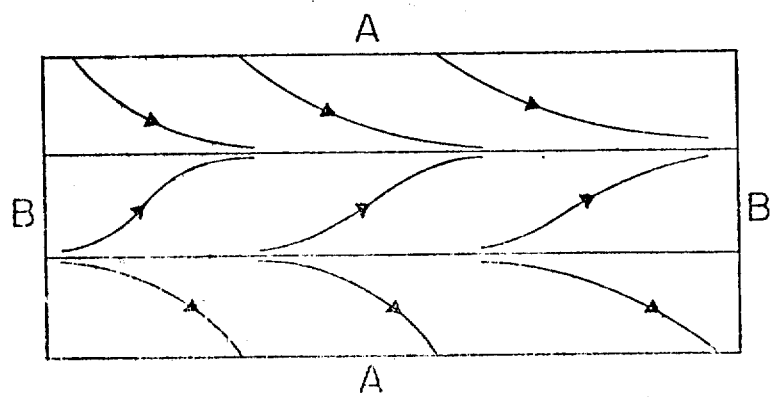

Referring to FIGS. 1, 2A and 2B, a hollow current carrying conductor 10, which may be either a single integral conductor or a plurality of segmented conductors, defines a toroidal chamber 11 within which there is mounted a suitably non-conductive toroidal envelope 12 formed of an electrically insulating, magnetically permeable material such as quartz or porcelain. Both conductor 10 and envelope 12 have a common axis Z which will be referred to in this specification and in the claims as "toroidal axis" or "axis of the toroid." The interior of envelope 12 is divided by internal wall 120 into two gas-tight chambers 121 and 122, and chamber 121 is filled with a suitable gas such as deuterium at a relatively low pressure, for example, on the order of one-thousandth of atmospheric pressure. Within chamber 122 there are mounted toroidal or azimuthal current carrying conductors 123 and 126 also having axis Z as their common toroidal axis. Conductor 123 may take the form of either a plurality of toroidal current carrying wires arranged about a longitudinal axis L1 and also having axis Z as a common toroidal axis, as shown by circles enclosing a dot in FIGS. 1 and 2, or a single toroidal current carrying conductor centered on longitudinal axis L1 as shown in FIG. 3A. Conductor 126 is embedded in an insulator which also serves as a support for 123, and conductor 126 may take the form of a plurality of current carrying wires as shown in FIGS. 1, 2A and 3A.

Mounted exteriorly of envelope 12 is a toroidal current carrying conductor 13 which may take the form of a plurality of toroidal current carrying wires illustrated by small circles each enclosing an "x" in FIGS. 1 and 2, all of which have axis Z as a common toroidal axis.

The gas within chamber 121 is first ionized to become a toroidal plasma, having Z as its toroidal axis, by any one of a number of wellknown arrangements (not shown) such as those disclosed in "Controlled Thermonuclear Reactions," Glasstone & Lovberg, pp. 116–163 (1960). Following ionization of the gas within chamber 121 to form a plasma, current carrying conductors 10, 123 and 13 are respectively energized in the following manner by suitable capacitor banks 130, 131, 132 such as those shown in H. G. Loos U.S. Pat. No. 3,009,080, to confine the toroidal plasma within chamber 121 to have the configuration 14 illustrated in FIGS. 2A, 2B, 3A, 3B and 4A. Current is directed poloidally through conductor 10, that is, transversely around the toroidal chamber 11 enclosed by conductor 10 as shown by the arrows in FIGS. 2A and 2B. At the same time current is directed through conductors 123, 126 and 13, with current being directed through conductors 123 and 136 in a direction opposite to the direction of current through conductor 13. For example, current may be directed through conductor 13 in a counter-clockwise direction around toroidal axis Z, as indicated in FIG. 1 by an "x" within the circles denoting the wires of conductor 13, whereas current is directed through conductors 123 and 126 in a clockwise direction around toroidal axis Z, as indicated in FIG. 1 by the dots within the circles denoting the wires of conductors 123 and 126.

Figure 3B:
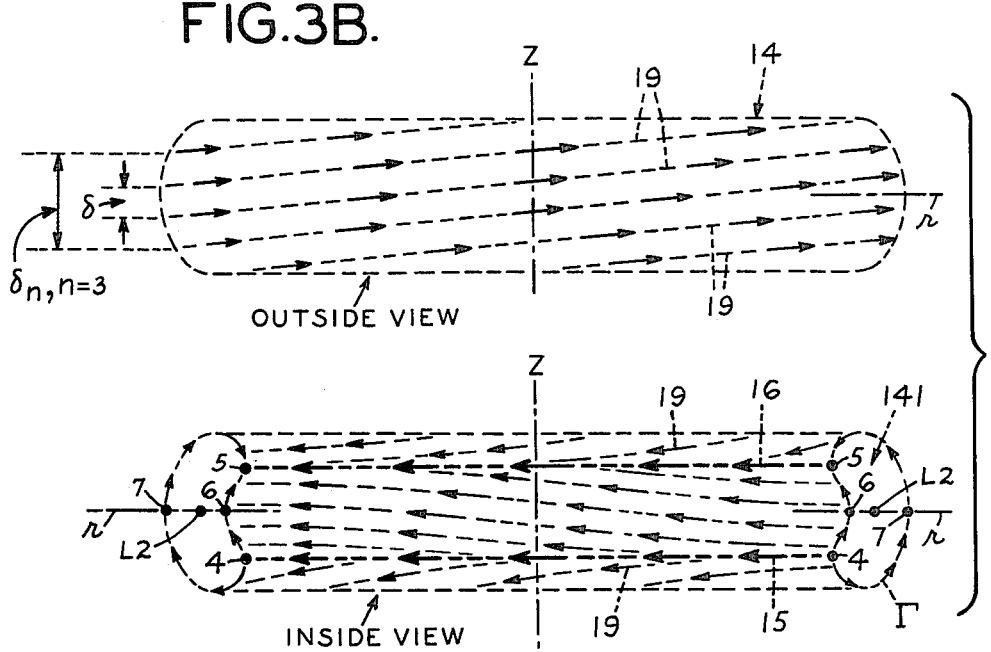
FIG. 3B is a pair of side views of a plasma confined in accordance with this invention, the upper of said pair of side views illustrating an outside view of the magnetic field lines on the outer or larger radius surface of said plasma, and the lower of said side views illustrating an inside view of the magnetic field lines and limit-cycles or closed magnetic field line orbits on the inner or smaller radius surface of said plasma.
Figure 4A:
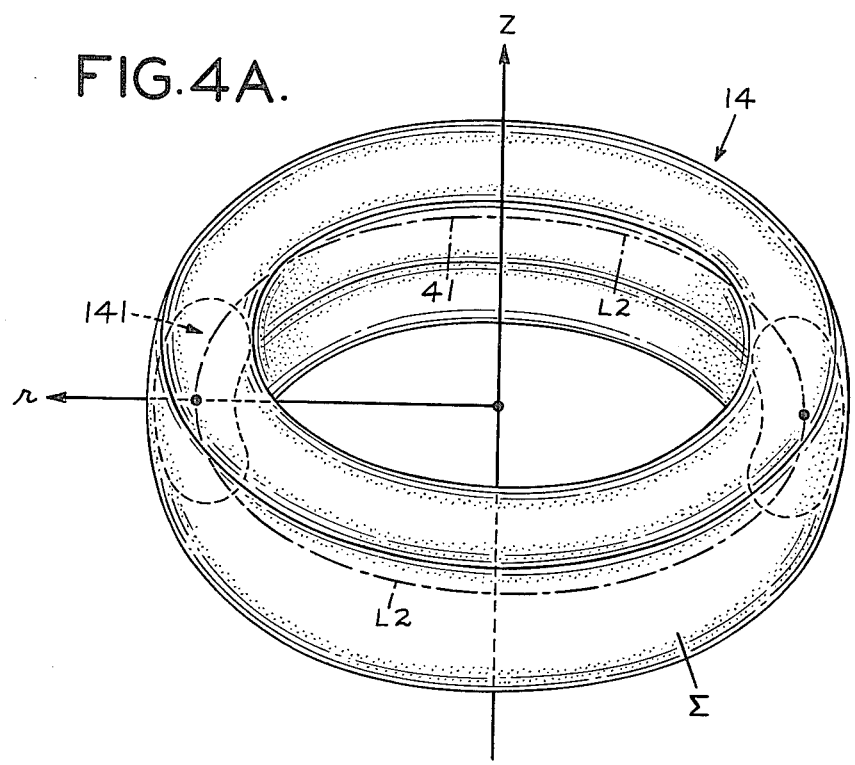
FIGS. 4–6 show a representation of the torus and magnetic field lines on the torus.
Figure 4B:
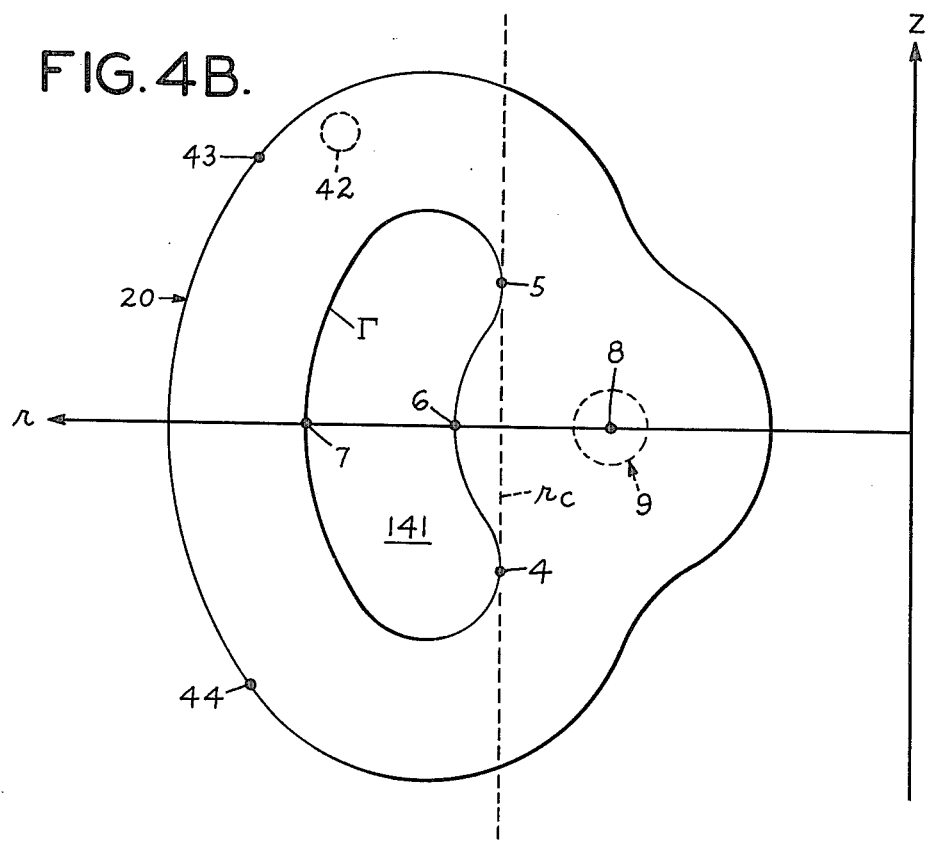
Figure 21:
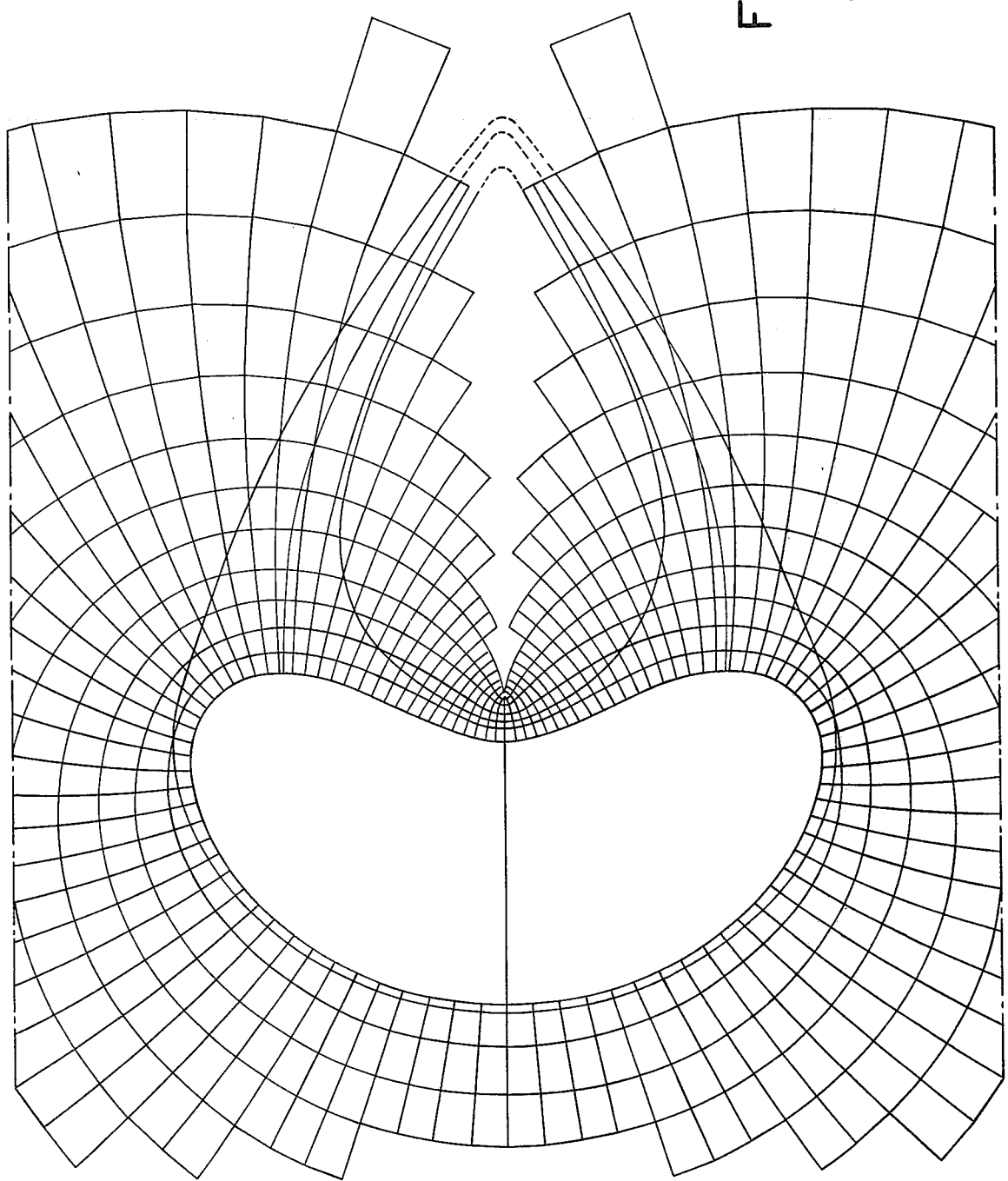
Figure 22:
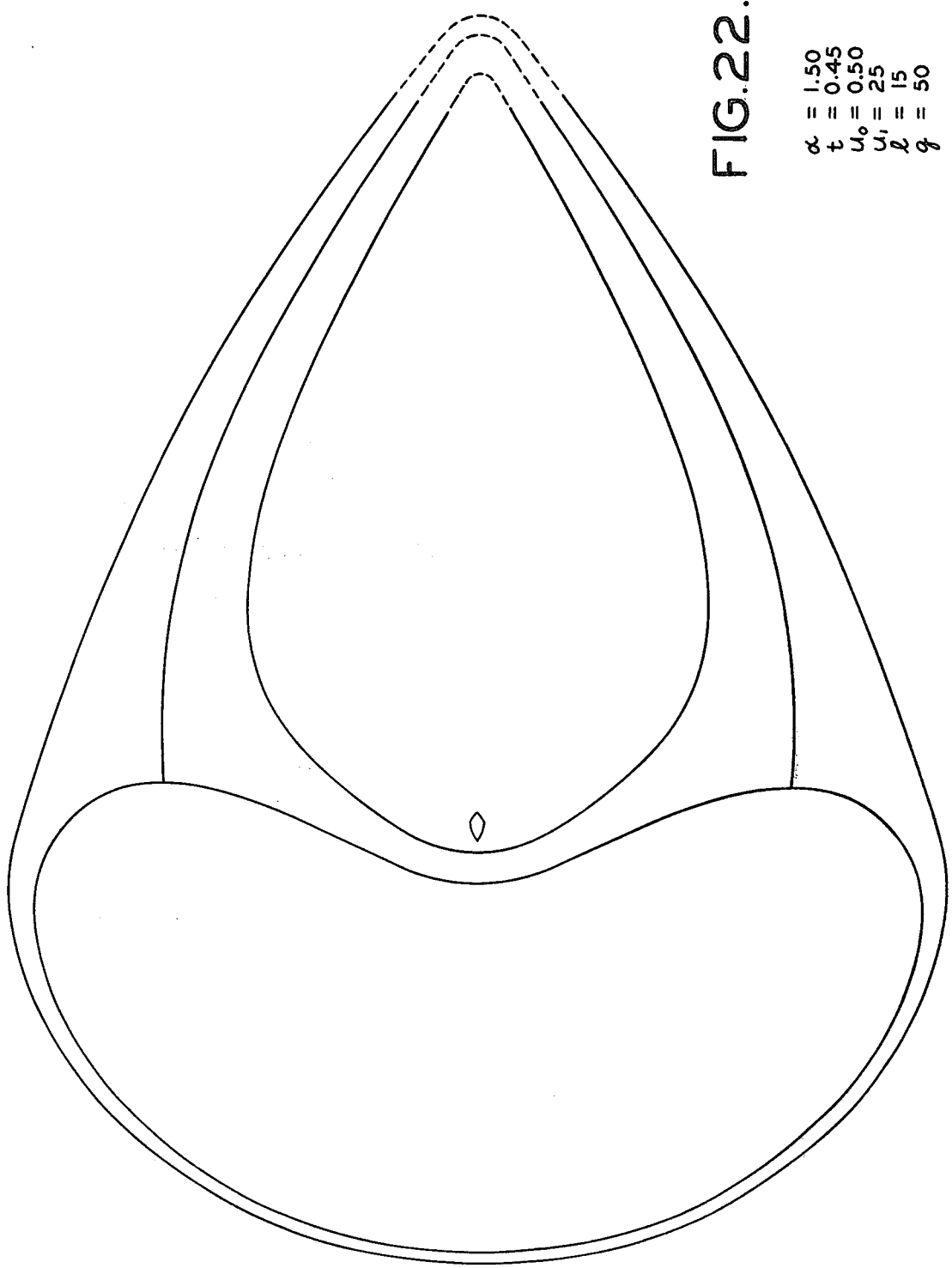
Figure 32:
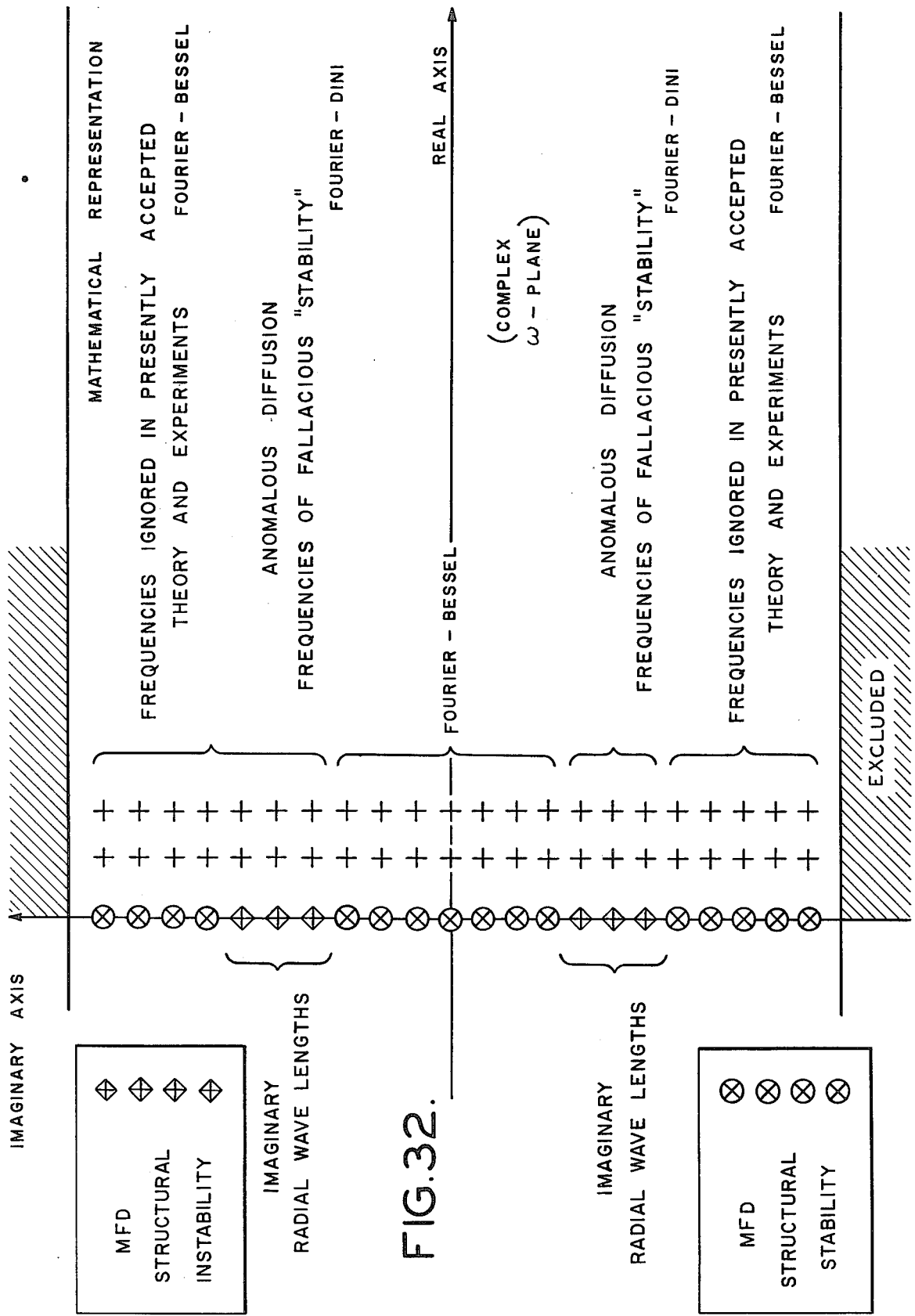
Figure 1:
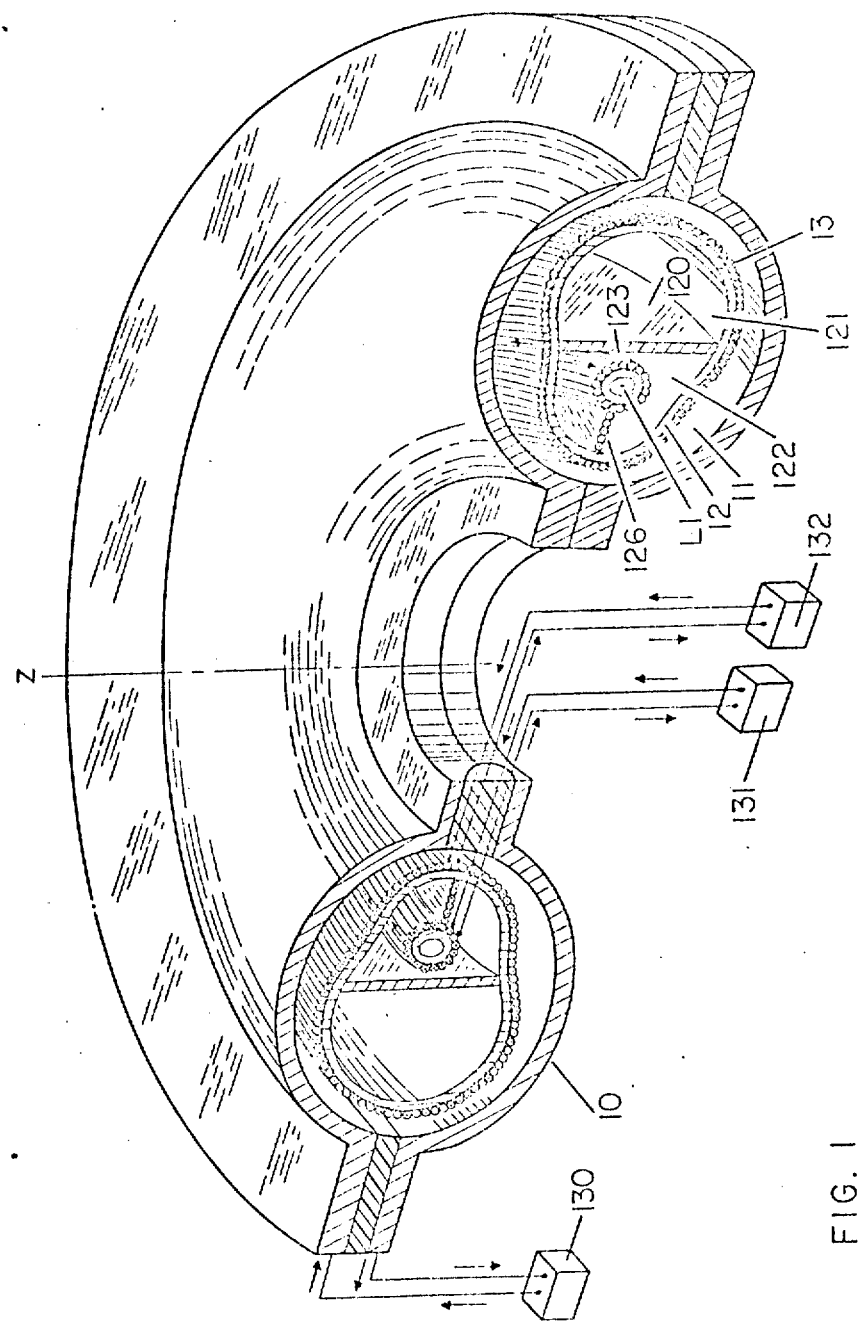

As will be explained in detail in the following portions of this specification, the currents flowing through conductors 10, 123, 126 and 13 generate within the interior of envelope 12 sets or families of toroidal magnetic fields or surfaces 124 and 125, as indicated by the lines with arrows in FIG. 2A and by the exemplary surfaces in FIG. 3A. The existence of two stagnation points, 4 and 5, in the poloidal component of the magnetic field is evident in FIG. 3A from the directions of the arrows which indicate the direction of the magnetic field lines produced by the currents in the plasma surface and in the wires 123 and 126. These currents also induce magnetic field lines 19 on the surface of plasma 14, as shown in FIG. 3B, the magnetic surfaces 124, 125 and the magnetic field lines 19 having certain properties required by this invention as defined in the above *Summary of the Invention*.

The magnetic field contributed by the current flowing through conductor 10 tends to displace the magnetic field lines 19 on the surface of plasma 14 inwardly toward its longitudinal axis L2, thereby tending to compress the plasma about its longitudinal axis L2, as well as to curve the magnetic field lines 19 on the surface of plasma 14 about toroidal axis Z. Currents in the wires 10, 123, 126 and 13 are adjusted pursuant to the criteria of topological stability explained herein, thereby to yield the final equilibrium configuration of the magnetic field.

The magnetic field contributed by the current flowing through conductors 123 and 126 adjusted in accordance with the principles of this invention serves to provide a region on the inner surface of plasma 14, that is, on the surface nearer toroidal axis Z and the smaller radius or internal wall 120 of envelope 12, on which magnetic field lines 19 are curved or pushed toward the longitudinal axis L2 of plasma 14 to form a "dimple" so that the poloidal cross section of plasma 14 is non-convex. This region is illustrated in the lower side view of FIG. 3B by the area between lines 15 and 16. The non-convex poloidal cross section may take any one of several forms, for example, a "kidney bean" shape in 141 as shown in FIGS. 2A, 2B, 3A.

The magnetic field generated by conductor 13 acts upon plasma 14 to prevent outward movement of plasma 14 away from toroidal axis Z toward the outer wall or larger radius side of chamber 121.

The combined effect of the magnetic field provided by currents through conductors 10, 123, 126, and 13 serves to confine plasma 14 so as to satisfy the requirements of topological stability.

Referring now to FIG. 3A, the two families or sets of magnetic fields or surfaces 124, 125 which are generated within envelope 12 by current through conductors 10, 123, 126 and 13, are characterized by the following properties. The family of magnetic fields 124 is nested toroidally about conductor 123, and the other family of magnetic fields 125 is nested toroidally between envelope 12 and the outer boundaries of both the family of magnetic fields 124 and plasma 14. The magnetic field lines enter and leave the vacuum volume surrounding plasma 14 from the conductor 126. There is a discontinuity in the tangential component of the magnetic field at the point where the magnetic field lines enter and leave from conductor 126. The magnitude of this discontinuity is determined by the specific values of the currents in the conductors 10, 123, 126 and 13 and in some cases it may not be present. It will be observed in FIGS. 3A and 3B that the poloidal component of the magnetic field at the surface of plasma 14 is not uniform in direction, but is characterized by two oppositely directed magnetic fields. Thus on the inner segment 465 which comprises arc 4 to 6 plus arc 6 to 5 of the boundary r of the poloidal cross section of plasma 14, that is, on the boundary of the poloidal cross section of plasma 14 which is nearer conductor 123 and the toroidal axis Z of plasma 14, the poloidal magnetic field line has a direction which is opposite to the direction of the poloidal field line on the outer segment 475 which comprises arc 4 to 7 plus arc 7 to 5 of r which is adjacent the outer wall of envelope 12 and further away from the toroidal axis Z of plasma 14. As a result, the poloidal components of the magnetic field lines 19 on the surface of plasma 14 are divided into two groups, each following the direction of the next adjacent one of the two sets of magnetic fields 124, 125 generated within the chamber 121. As shown in FIGS. 3A and 3B, the poloidal components of the magnetic field lines 19 on the inner segment 465 of boundary r have the same direction as adjacent magnetic surface family 124, while the poloidal components of the magnetic field lines 19 on the outer segment 475 of boundary r follow the direction of the adjacent magnetic surface family 125.

The rotational transform angle of the magnetic field lines 19 on the surface of plasma 14 is required by the principles of this invention to be identically and persistently zero for all sufficiently small deviations in the parameters of the overall system. This requirment is illustrated in FIGS. 2A and 3B, in which the magnetic field lines 19 on the plasma surface are divided into two regions by magnetic field lines 15 and 16 on the surface of plasma 14. Field lines 15 and 16 are "closed", that is, they describe a closed circular, toroidal orbit on the surface of plasma 14. In accordance with principles of this invention as set forth in this specification, the number, N, of closed magnetic field lines such as 15, 16 must be even, that is, N=2, 4, 6, . . . , and these closed field lines divide the surface of plasma 14 into a corresponding number of N toroidal regions. Thus as illustrated in FIG. 3B (inside view), the two closed magnetic field lines 15 and 16 divide the surface of plasma 14 into a corresponding pair of toroidal regions.

Within the plasma surface regions between the closed magnetic field lines, all other magnetic field lines describe non-closed toroidal paths which asymptotically approach or depart from the closed field lines. This is illustrated, for example, in FIG. 3B (inside view), in which the non-closed magnetic field lines 19 asymptotically depart from closed field line 15 and asymptotically approach closed field line 16 but do not cross either of closed lines 15 and 16. FIGS. 2A and 3B also illustrate that the path of a non-closed field line 19 is displaced by a finite angle, δ, during each orbit around the circumference of plasma 14. This angle cannot exceed $2\pi$ or 360° during any given orbit around the circumference of plasma 14 because no non-closed magnetic field line 19 can cross closed field lines 15 and 16. The total displacement angle $\delta_n$ after n circuits of a magnetic field line 19 around the circumference of plasma 14 cannot exceed $2\pi$ for the same reason.

By definition, the rotational transform angle of magnetic field lines 19 is the limit of the ratio of total displacement angle $\delta_n$ to $2\pi n$, for an arbitrarily large value of n, that is $$n \xrightarrow{\lim} \infty \frac{\delta_n}{2\pi n}.$$

Because $\delta_n$ cannot exceed $2\pi$ in order to comply with the topological stability principles of this invention, the limit ratio ($\delta_n/2\pi n$,) for n arbitrarily large, is identically zero and remains persistently zero for non-closed magnetic field lines 19. In addition, because all of the closed field lines have zero rotational transform angles by virtue of their closed nature, the entire class of both closed and non-closed magnetic field lines on the surface of plasma 14 is characterized by a zero rotational transform angle.

Figure 7:
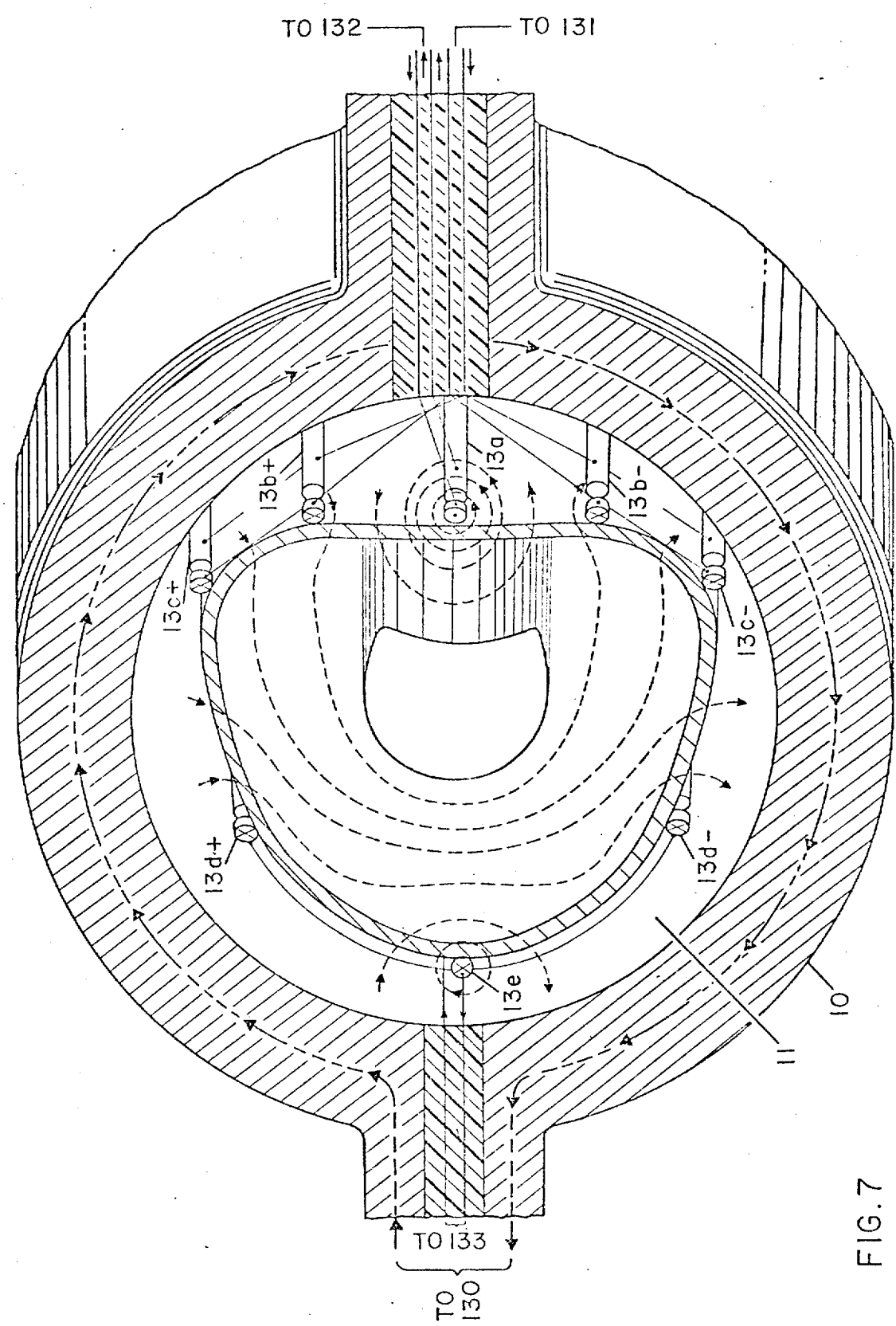
FIG. 7 is a schematic perspective view partially in section illustrating the various current carrying conductors and other elements for which numerical values are given, for a second alternative to the configuration of FIG. 1.

FIG. 7 shows a somewhat simpler arrangement of the axially symmetric embodiment of FIG. 1. In FIG. 1 wires 13, 123, and 126 have been located and current values fixed in such a way as to reduce to zero the final magnetic field outside of the toroid bounded by wires 13. In this case there must be present initially a bias flux through the surface between the plasma and the toroidal axis. This flux which will decline to zero during the period that the given magnetic configuration is being established, must be equal in magnitude to the final net flux through the annulus between the plasma and the innermost member of wires 13. The configuration of FIG. 7, on the other hand, does not completely confine the magnetic field to the neighborhood of the plasma and satisfies the requirement that the net flux between the plasma and the toroidal axis is constant (equal to zero) during the time that the confining magnetic field is turned on without this necessity of a bias flux. In this embodiment, the role played by wires 123 and 126 of FIG. 1 is played by the single wire 13a of FIG. 7, and similarly wires 13 are replaced by the seven wires 13$b\pm$, 13$c\pm$, 13$d\pm$ and 13e. Wire locations and current values for this case are given below under the heading Example.

Ordinary stability against drift or any global mode of instabiliy such as the interchange, the kink or the flute instabilities is evident from the fact that the two limit cycles are perforce the innermost field lines on the plasma surface since the field is purely toroidal there and the toroidal field falls off as 1/r. These two lines hug a critical cylinder of radius $r_{min}$ since the magnetic pressure becomes greater than the fluid pressure for a displacement inward and less than the fluid pressure for a displacement outward with the force imbalance being restorative in both cases.

Figure 8:
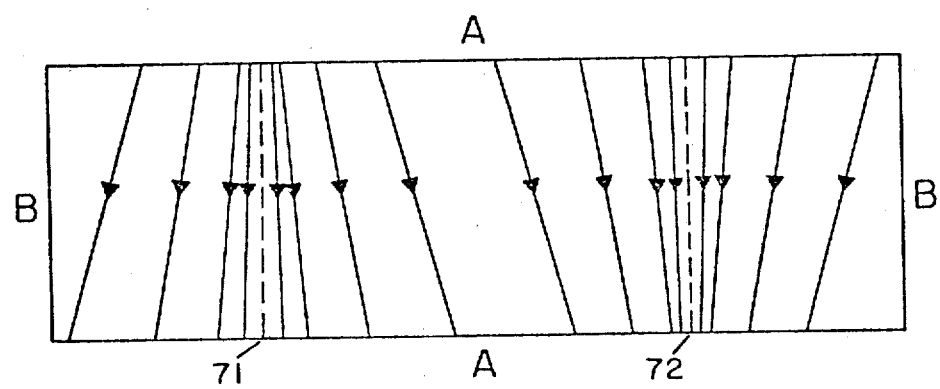
FIG. 8 is a schematic representation of a toroidal magnetic confinement configuration with two poloidal limit cycles on the surface of the plasma.

A second embodiment of the invention is shown in FIG. 8, in which the limit cycles lie in planes containing the axis Z of the toroid. FIG. 8 shows exactly two limit cycles 71, 72 lying in the same plane on opposite sides of the toroid, and other field lines wind around the toroid leaving the one limit cycle asymptotically and approaching the other asymptotically.

A third embodiment (not shown) lies intermediate between the cases in which the limit cycles, still finite in number, are neither purely toroidal nor purely poloidal. In this third embodiment the limit cycles are helically twisted; that is, they wind around the torus one or more times before closing on themselves. The finite number n of closed field lines then posses a rational rotational transform, and all other field lines on the surface are asymptotic to these closed field lines.

Other embodiments are also possible, for example, variations of the above three with internal conductors present.

EXAMPLE

Figure 9:
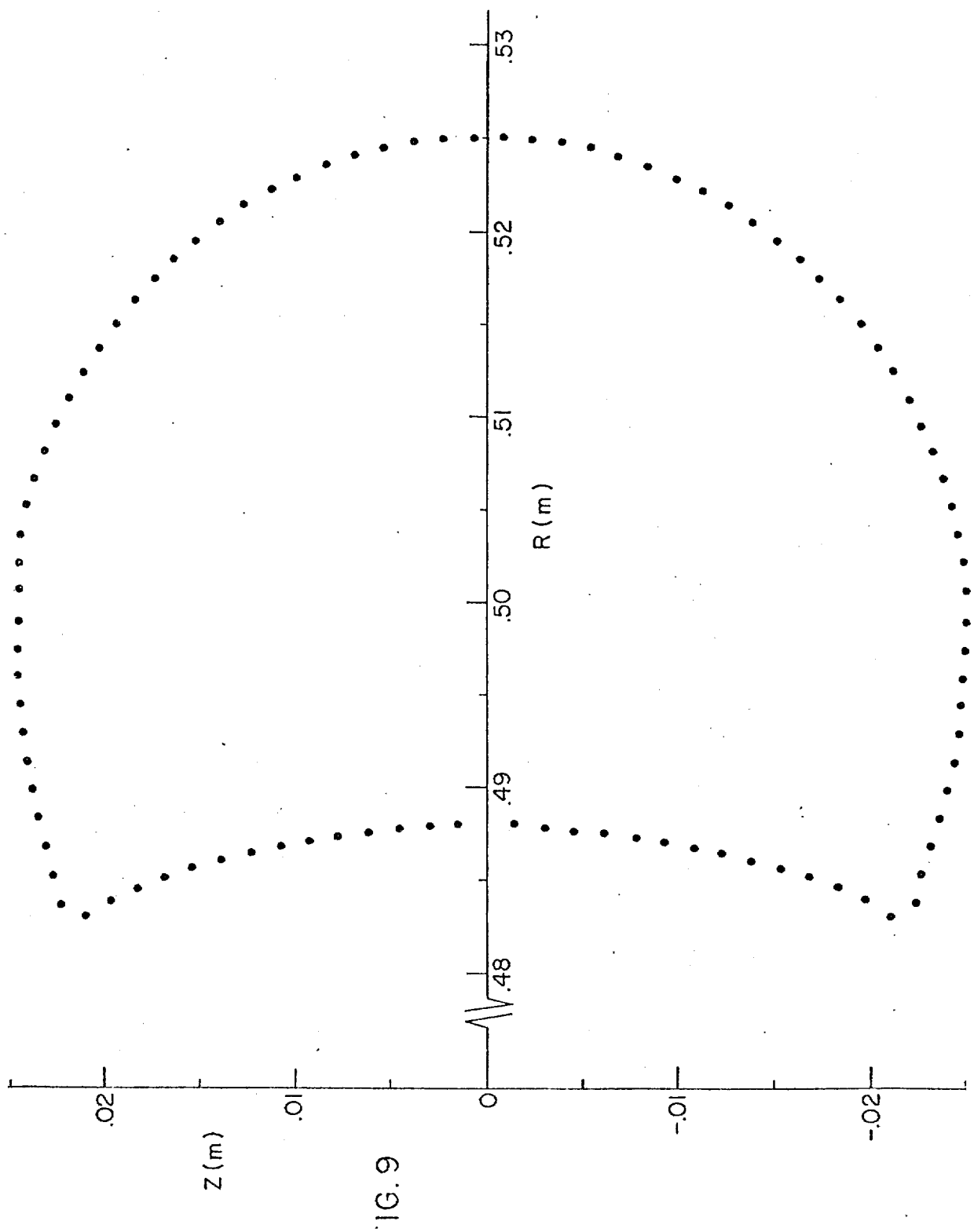
FIG. 9 is the poloidal cross-section of the plasma for a specific embodiment of the invention.
Figure 10:
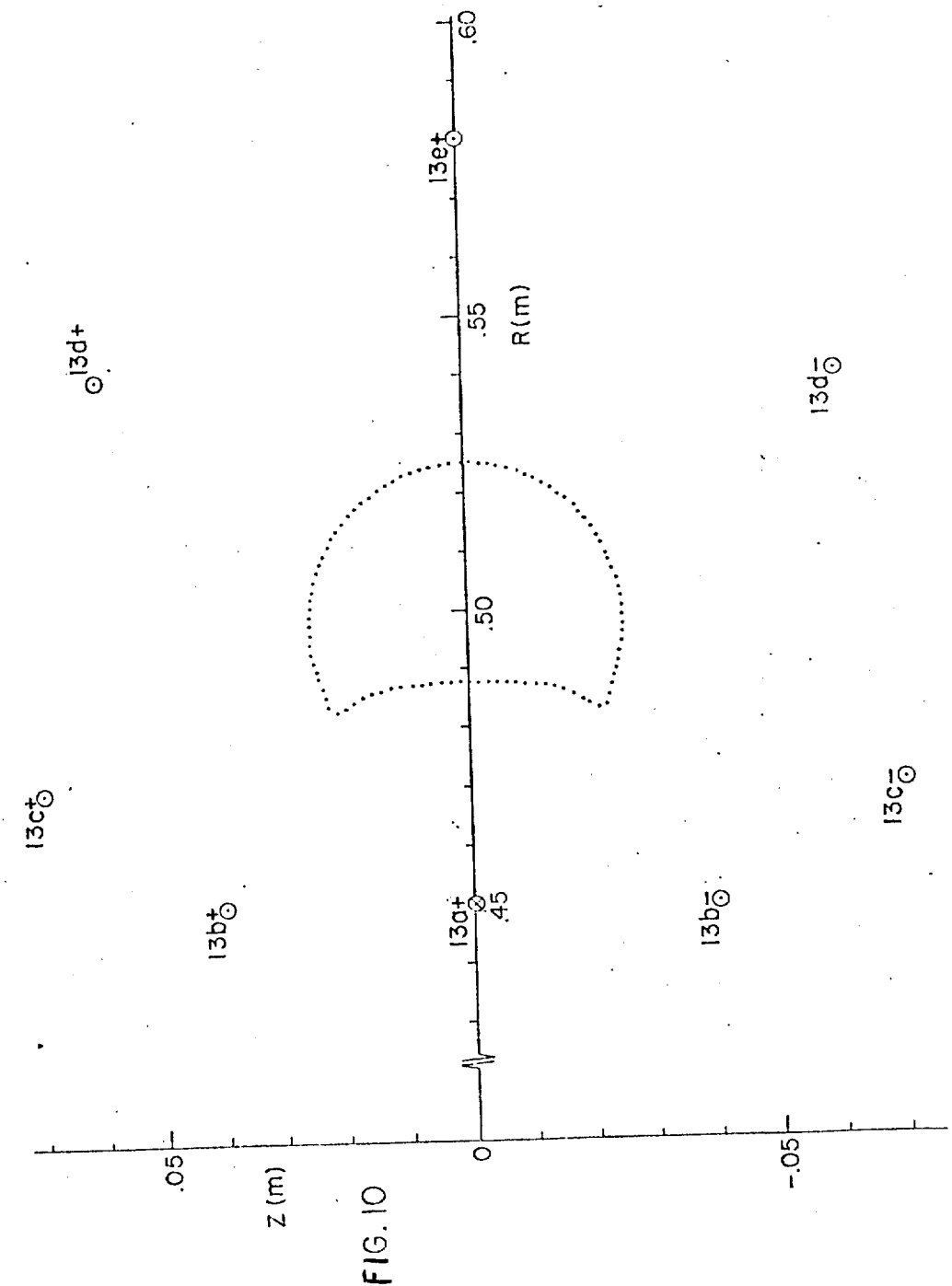
FIG. 10 shows the location of current carrying wires to produce the magnetic configuration of FIG. 9.

The poloidal cross-section of a toroidal plasma provided with topological stability in accordance with the principles of this invention is illustrated in FIGS. 7, 9, and 10. This plasma has an outside diameter of 1.02 meters and an overall height of 0.045 meters. The boundary, r, of the plasma cross-section is described by the set of position values given in Table I below. These position values were obtained in accordance with the principles of this invention by locating the conductors 13 to produce a tangent magnetic field constant in magnitude everywhere on the surface of the plasma.

The plasma equilibrium configuration for the embodiment shown in FIG. 9 may be obtained by magnetic induction, in which cases the magnetic pressure is composed of two contributions, one toroidal and the other poloidal.

$$\frac{B^2}{2\mu} = \frac{B_t^2}{2\mu} + \frac{B_p^2}{2\mu} \quad (MKS \text{ units})$$

The toroidal contribution is:

$$\frac{B_t^2}{2\mu} = \frac{B_o^2 r_c^2}{2\mu r^2}$$

where $B_o$ and $r_c$ are initial values of the total equilibrium magnetic field magnitude on the plasma surface and the minimum radius of the plasma equilibrium boundary cross-section, respectively. The poloidal contribution is:

$$\frac{B_p^2}{2\mu} = \frac{\mu K^2}{2}$$

where the surface current density K is that of the boundary condition $$\hat{n} \times (\vec{B}_+ - \vec{B}_-) = \mu \vec{K}$$

(see Stratton, Electromagnetic Theory, McGraw-Hill, 1941.) The surface current density $K_n$ corresponding to the position of the $n^{th}$ conductor on the plasma surface is $$K_n = \frac{J_n}{\Delta l_n}$$

wherein $J_n$ is the current induced in that conductor and $\Delta l_n$ the length of boundary corresponding to that conductor allotted to it.

The locations and currents of the external conductors for the embodiment shown in FIG. 9 are given in Table II. FIG. 10 illustrates the position of the equilibrium plasma boundary r relative to the locations of the conductors 13a, 13b+, 13b−, 13c+, 13c−, 13d+, 13d−, 13e specified in Table II. (To avoid unnecessarily complicating the drawings of FIGS. 7 and 10, the insulators or other well known means for maintaining these conductors in their proper positions have not been shown.) These currents correspond to a total magnetic at the plasma of 200,000 Gauss. Lower magnetic fields would require proportionally lower currents.

TABLE I

| Point Positions Of Plasma Boundary r Shown in FIG. 9 | |
|---|---|
| r (meter) | z (meter) |
| .5251 | ±.0007 |
| .5250 | ±.0023 |
| .5248 | ±.0039 |
| .5245 | ±.0054 |
| .5240 | ±.0070 |
| .5235 | ±.0084 |
| .5229 | ±.0099 |
| .5222 | ±.0113 |
| .5214 | ±.0127 |
| .5205 | ±.0140 |
| .5195 | ±.0152 |
| .5184 | ±.0164 |
| .5173 | ±.0175 |
| .5161 | ±.0185 |
| .5149 | ±.0195 |
| .5136 | ±.0204 |
| .5122 | ±.0213 |
| .5108 | ±.0220 |
| .5094 | ±.0227 |

TABLE I-continued

| Point Positions Of Plasma Boundary r Shown in FIG. 9 | |
|---|---|
| r (meter) | z (meter) |
| .5080 | ±.0233 |
| .5065 | ±.0238 |
| .5049 | ±.0243 |
| .5034 | ±.0246 |
| .5018 | ±.0249 |
| .5003 | ±.0251 |
| .4987 | ±.0252 |
| .4971 | ±.0252 |
| .4955 | ±.0251 |
| .4940 | ±.0249 |
| .4924 | ±.0247 |
| .4908 | ±.0244 |
| .4893 | ±.0240 |
| .4878 | ±.0236 |
| .4863 | ±.0232 |
| .4847 | ±.0227 |
| .4832 | ±.0225 |
| .4832 | ±.0209 |
| .4840 | ±.0195 |
| .4847 | ±.0181 |
| .4852 | ±.0166 |
| .4857 | ±.0151 |
| .4862 | ±.0136 |
| .4866 | ±.0120 |
| .4869 | ±.0105 |
| .4872 | ±.0089 |
| .4874 | ±.0074 |
| .4876 | ±.0058 |
| .4878 | ±.0042 |
| .4879 | ±.0027 |
| .4878 | ±.0011 |

TABLE II

| Locations And Currents Of External Conductors Shown in FIG. 10 | | | |
|---|---|---|---|
| Wire | r (meters) | z (meters) | current (amps) |
| 13a | .45 | 0 | +600,000 |
| 13b+ | .45 | +.04 | −130,000 |
| 13b− | .45 | −.04 | −130,000 |
| 13c+ | .47 | +.07 | −130,000 |
| 13c− | .47 | −.07 | −130,000 |
| 13d+ | .54 | +.06 | −240,000 |
| 13d− | .54 | −.06 | −240,000 |
| 13e | .58 | 0 | −240,000 |

We claim:

1. The method of producing in a topologically toroidal vacuum volume a high temperature topologically toroidal plasma volume externally dynamically stabilizable comprising the steps of generating a topologically toroidal plasma of selected beta value, and confining said plasma by a magnetic field so that the interface of said vacuum and said plasma is a smooth magnetic surface without cusps tangent to the surface of said plasma and characterized by static structural stability, a rational rotation number, and at least but not more than a selected finite even non-zero number of axially non-symmetric topologically closed magnetic field lines, wherein said step of confining said plasma by a magnetic field includes the further steps of generating a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, generating a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and generating a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

2. The method as defined in claim 1 wherein said selected beta value is a medium beta value.

3. The method as defined in claim 1 wherein said selected beta value is a high beta value.

4. A topologically toroidal high temperature plasma confined within a vacuum by a smooth magnetic surface without cusps characterized by static structural stability, comprising an interface between said plasma and said vacuum which is a smooth magnetic surface composed entirely of magnetic field lines tangent to the surface of said plasma and having a rational rotation number and at least but not more than a selected finite even non-zero number of which are topologically closed and axially non-symmetric, wherein said magnetic field lines are generated by a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

5. The method of effectively confining in a topologically toroidal vacuum volume a high temperature topologically toroidal plasma volume, consisting of the steps of generating a topologically toroidal plasma of selected beta value, said plasma comprising a relatively low-density fully ionized light element gas, and confining said plasma by a magnetic field so that the interface of said plasma and said vacuum is a smooth magnetic surface without cusps essentially tangent to the surface of said plasma volume, said magnetic field surface being characterized by static structural stability, a rational rotation number, and at least but not more than a selected finite even non-zero number of topologically closed axially non-symmetric magnetic field lines, wherein said step of confining said plasma by a magnetic field includes the further steps of generating a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, generating a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and generating a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct familes of magnetic surfaces produced by said first, second and third currents.

6. In combination with the method as defined in claim 5, the additional step of providing asymptotic dynamic stability by confining said plasma to have a local average toroidal aspect ratio on the order of 240.

7. The method of magnetically confining a topologically toroidal high temperature plasma within a vacuum so that the magnetic surface confining said plasma is characterized by static structural stability, which comprises the step of generating in said vacuum surrounding said plasma a magnetic field that urges the surface of said plasma into a smooth topologically toroidal configuration without cusps so that the interface between said plasma and said vacuum is composed entirely of magnetic field lines collectively constituting a magnetic surface tangent to the surface of said plasma and having a rational rotation number and at least but not more than N topologically closed axially non-symmetric magnetic field lines, where N is a selected finite even number greater than zero (N=2, 4, 6, 8, . . .), wherein said magnetic field lines are generated by a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

8. A high temperature plasma confined in a vacuum by a topologically toroidal smooth magnetic surface without cusps tangent to the surface of said plasma and composed of magnetic field lines characterized by a rational rotation number, and at least but not more than a selected finite non-xero even number of topologically closed axially non-symmetric magnetic field lines at the interface of said plasma and said vacuum, so that said magnetic surface is characterized by static structural stability, wherein said magnetic field lines are generated by a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

9. The method of producing in a toplogically toroidal vacuum volume a high temperature topologically toroidal plasma volume characterized by asymptotic dynamic stability, consisting of the steps of generating a high beta topologically toroidal smooth-surfaced plasma without cusps, producing at the interface of said plasma and said vacuum a smooth magnetic surface comprising a confining magnetic field each of whose toroidal components exceeds in magnitude all poloidal components, wherein said confining magnetic field is essentially tangent to the surface of said plasma and is characterized by static structural stability, a rational rotation number and at least but not more than a selected finite non-zero even number of topologically closed axially non-symmetric magnetic field lines, and arranging all toroidally curved sections of said plasma to have average major radii of magnitude on the order of 240 times greater than the corresponding average minor radii, wherein said step of producing at the interface of said plasma and said vacuum a smooth magnetic surface including the further steps of generating a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, generating a second current to effect a first toroidal flow of current longitudinally of said plasma and exteriorly thereof adjacent the side of the plasma having a relatively small radius in comparison to the diametrically opposite large radius side of said plasma, thereby to curve said magnetic surface in a direction away from said toroidal axis and toward the longitudinal axis of said plasma so that the poloidal cross-section of said plasma is non-convex, and generating a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

10. Apparatus for confining a high temperature topologically toroidal plasma which comprises means for generating a topologically toroidal plasma of selected beta value, and means for confining said plasma by a smooth magnetic surface comprising a magnetic field tangent to the surface of said plasma, said magnetic field having at least but not more than a selected finite even non-zero number of topologically closed axially non-symmetric magnetic field lines on the toroidal surface of said plasma and an infinite number of additional field lines on the toroidal surface of said plasma, wherein each of said infinite number of additional field lines is asymptotic to two of said topologically closed field lines and wherein the magnitude of said magnetic field has a constant value at each point on the surface of said plasma, so that said magnetic field is characterized by static structural stability, said means for confining said plasma including means for generating a first current to effect a poloidal flow of current transversely around and exteriorly of said plasma, in order to tend to displace said magnetic surface inwardly toward the longitudinal axis of said plasma and thereby compress said plasma about its longitudinal axis, as well as to curve said magnetic surface about the toroidal axis of said plasma, means for generating a second current to effect a first toroidal flow of current longitudinally of said plasma and exteriorly thereof adjacent the side of said plasma having a relatively small radius in comparison to the diametrically opposite large radius side of said plasma, thereby to further curve said magnetic surface in a direction away from said toroidal axis and toward the longitudinal axis of said plasma so that the poloidal cross-section of said plasma is non-convex, and means for generating a third current exteriorly of both said plasma and said second current to effect a second toroidal flow of current longitudinally of said plasma and in a direction opposite to the direction of said first toroidal flow of current, thereby to prevent movement of said plasma in a direction toward the large radius side of said plasma, and where the values of said first, second and third currents are selected so that said plasma is bounded by only a single such smooth magnetic surface, said smooth magnetic surface being the product of the interaction of two separate and distinct families of magnetic surfaces produced by said first, second and third currents.

* * * * *

UNITED STATES PATENT AND TRADEMARK OFFICE
CERTIFICATE OF CORRECTION

PATENT NO. : 4,235,668

DATED : November 25, 1980

INVENTOR(S) : Robert W. Bass

It is certified that error appears in the above—identified patent and that said Letters Patent is hereby corrected as shown below:

Sheets 5 thru 9 of the drawings should be deleted to appear as per attached sheets 5-9.

Column 3, line 6, change "This" to --The--.

Column 5, line 44, change "136" to --126--.

Column 8, line 66, Change "cases" to --case--.

Column 9, line 45, after "magnetic" insert --field--.

Signed and Sealed this

Twenty-fourth Day of March 1981

[SEAL]

Attest:

RENE D. TEGTMEYER

Attesting Officer   Acting Commissioner of Patents and Trademarks

OUTSIDE VIEW

INSIDE VIEW

UNITED STATES PATENT AND TRADEMARK OFFICE
CERTIFICATE OF CORRECTION

PATENT NO. : 4,235,668
DATED : November 25, 1980
INVENTOR(S) : Robert W. Bass

It is certified that error appears in the above—identified patent and that said Letters Patent is hereby corrected as shown below:

Sheets 1 thru 9 of the drawings should be deleted to appear as per attached sheets 1-9.

Column 3, line 6, "This" should read -- The --.

Column 5, line 44, "136" should read -- 126 --.

Column 8, line 66, "cases" should read -- case --.

Column 9, line 45, after "magnetic" insert -- field --.

This Certificate supersedes Certificate of Correction issued March 24, 1981.

Signed and Sealed this

Seventh Day of July 1981

[SEAL]

Attest:

RENE D. TEGTMEYER

Attesting Officer   Acting Commissioner of Patents and Trademarks